US007716177B2

(12) United States Patent
Zhang et al.

(10) Patent No.: US 7,716,177 B2
(45) Date of Patent: May 11, 2010

(54) PROACTIVE SPACE ALLOCATION IN A DATABASE SYSTEM

(75) Inventors: Wei Zhang, Foster City, CA (US); Amit Ganesh, San Jose, CA (US); Sujatha Muthulingam, Sunnyvale, CA (US); Niloy Mukherjee, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 332 days.

(21) Appl. No.: 11/880,917

(22) Filed: Jul. 24, 2007

(65) Prior Publication Data

US 2009/0030956 A1     Jan. 29, 2009

(51) Int. Cl.
*G06F 17/30* (2006.01)
(52) U.S. Cl. ........................ 707/609; 707/640
(58) Field of Classification Search ......... 707/100–102, 707/200–209
See application file for complete search history.

(56) References Cited

U.S. PATENT DOCUMENTS

| | | | |
|---|---|---|---|
| 6,917,949 B1 * | 7/2005 | Nguyen | 707/203 |
| 7,080,224 B2 * | 7/2006 | Soejima et al. | 711/162 |
| 2002/0129048 A1 * | 9/2002 | Qiu et al. | 707/204 |
| 2004/0107223 A1 * | 6/2004 | Uno et al. | 707/200 |
| 2008/0168084 A1 * | 7/2008 | Nara et al. | 707/102 |

OTHER PUBLICATIONS

Cyran, Michele, et al., "Oracle® Database—Concepts", Oracle, 10 g Release 2 (10.2), dated Oct. 2005, 542 pages.

* cited by examiner

*Primary Examiner*—Wilson Lee
(74) *Attorney, Agent, or Firm*—Hickman Palermo Truong & Becker LLP; Christian A. Nicholes

(57) ABSTRACT

A method and apparatus for proactively allocating space to a logical layer of a database is provided. Allocation of space to a logical layer of a database is an expensive operation that should be minimized. The allocation of space includes discovering free space in all the higher layers in the logical storage hierarchy. It also includes cross-domain system calls and cleansing disk-write operations. In prior approaches, the allocation processes were triggered on-demand, only a certain logical layer was discovered to be at full capacity when an insert-row operation was attempted. In one embodiment of the invention, space needs are statistically predicted based on prior rates of space consumption. The database server pre-allocates space as needed, based on the statistical predictions. Rates of consumption are examined periodically. Space is pre-allocated before any logical layer reaches full capacity by a combination of proactive background processes; foreground-triggered, background processes; and classic foreground allocation.

20 Claims, 5 Drawing Sheets

PROACTIVE SPACE ALLOCATION IN A DATABASE SYSTEM

FIELD OF THE INVENTION

The present invention relates to the management of storage structures in file storage systems, and, in particular, space allocation as it relates to logical storage structures in a database system.

BACKGROUND

The purpose of a database is to store and retrieve related information. In general, a database server reliably manages a large amount of data in a multi-user environment so that many users can concurrently access the same data.

A database, such as an Oracle database, has logical structures and physical structures. Because the physical and logical structures are separate, the physical storage of data can be managed without affecting the access to logical storage structures.

Every Oracle database has one or more physical datafiles. A datafile conforms to the operating system in which the database is running. The datafiles contain all the database data. The data of logical database structures, such as tables and indexes, are physically stored in datafiles allocated for a database. Once a datafile is allocated to a database, the disk blocks are formatted and set aside for exclusive use by the database system.

One or more datafiles form a logical unit of database storage called a tablespace. Each database is logically divided into one or more tablespaces, and each of the tablespaces consists of one or more datafiles. The combined size of the datafiles in a tablespace is the total storage capacity of the tablespace. A simple database may consist of one physical datafile that stores the data of one logical tablespace. Another database may consist of six datafiles that store the data of three tablespaces, wherein each tablespace consists of two datafiles.

More layers of logical structure exist under the logical structure of a tablespace. Referring to FIG. 1, at the finest level of granularity, Oracle database data is stored in data blocks 101. One data block corresponds to a specific number of bytes of physical database space on disk. The next level of logical database space is an extent 103. An extent is a specific number of contiguous data blocks allocated for storing a specific type of information. The level of logical database storage greater than an extent is called a segment. A segment 105 is a set of extents, each of which has been allocated for a specific data structure and all of which are stored in the same tablespace. For example, each table's data is stored in its own data segment, while each index's data is stored in its own index segment. If the table or index is partitioned, each partition is stored in its own segment.

The logical storage structures of an Oracle database system are fully described in the Oracle 10g documentation, including in a publication entitled "Oracle Database: Concepts," 10g Release 2 (10.2), B14220-02, October 2005, the contents of which are hereby incorporated by reference as if fully set forth herein.

When a database is created in Oracle, at least one datafile and one tablespace are created for the database. The datafile is logically divided up into data blocks. A data block is the smallest unit of data used by a database. When a table is created in the database, Oracle allocates to the table's segment an initial extent of a specified number of contiguous data blocks. Although no rows have been inserted into the table, the data blocks that correspond to the initial extent are reserved for that table's rows.

When the existing space in a segment is completely used, then the database server allocates a new extent for the segment. To allocate a new extent, the server first determines a candidate datafile within the tablespace. The datafile's metadata is examined to determine if the datafile has the required number of adjacent free blocks. If that datafile does not have enough adjacent free space, then the server looks in another datafile. If no datafiles in the tablespace has enough adjacent free space, then the database server may request space from outside the database system to be allocated into the database system. The server requests from the disk subsystem, allocation of a new datafile to the tablespace. The server may also request the extension of an existing datafile. These operations are very expensive, requiring crossing between the domains of the database system and the underlying file system, and should be minimized. In order for a file system to allocate more disk space as datafile space for the database, a cleansing process must occur, including disk-write operations like physically writing 0s to the part of the disk being allocated.

In a prior approach, Oracle provides proactive help in managing tablespaces by triggering alerts to a database administrator, who can access the alert through a control interface. The alerts are either a warning or a critical alert. The warning threshold is the limit at which space is beginning to run low. The critical threshold is a serious limit that warrants a database administrator's immediate attention. The thresholds that trigger an alert are either based on percentage-full or by kilobytes of free space remaining, regardless of the rate of consumption over time. Thus, allocation that is in response to these alerts may not be sufficient to fulfill a user's demand for space if a large amount of space is suddenly needed within a short period of time. No alerts exist for managing space in the extent or segment layer.

In a highly concurrent environment, for example, where an online retailer experiences a surge of database activity that requires the insertion of hundreds of thousands of rows in the database within minutes, a database server operating under the prior approach to space allocation will not satisfy the demand for space in a timely manner. In such an environment, an extent will be filled just as soon as it is allocated. The throughput on the database server will nearly drop to zero as the server constantly needs to examine datafiles for free contiguous data blocks to be allocated as extents. Furthermore, allocating new datafiles is also an expensive operation that involves time-consuming cross-domain system calls and disk-write operations. If such a highly concurrent environment reaches full capacity, then the processing of insertion requests from concurrent users will grind to a halt as the system allocates new space to each layer.

A prior approach to managing space for schema objects in an Oracle database system is fully described in the Oracle 10g documentation, including in a publication entitled, "Oracle Database: Administrator's Guide," 10g Release 2 (10.2), B14231-02, May 2006, the contents of which are hereby incorporated by reference as if fully set forth herein.

It would be advantageous for a database system to proactively allocate space to a logical layer of the database, as needed, and to complete the allocation in a timely manner, before the layer reaches full capacity.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for proactive allocation of space in a database system, and in particular, for statistically projecting the usage of space of a logical layer of a database within a particular time period, and automatically pre-allocating space to that layer, as needed, in a timely manner. Techniques are also provided for pre-allocating space based on statistically projecting when a logical layer of a database will reach full capacity. While the examples given of embodiments of the invention are based on the Oracle Database, one of ordinary skill in the art would understand that the techniques disclosed and claimed may be applied to other database systems, or other file storage systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Allocation of Space

Figure 1:
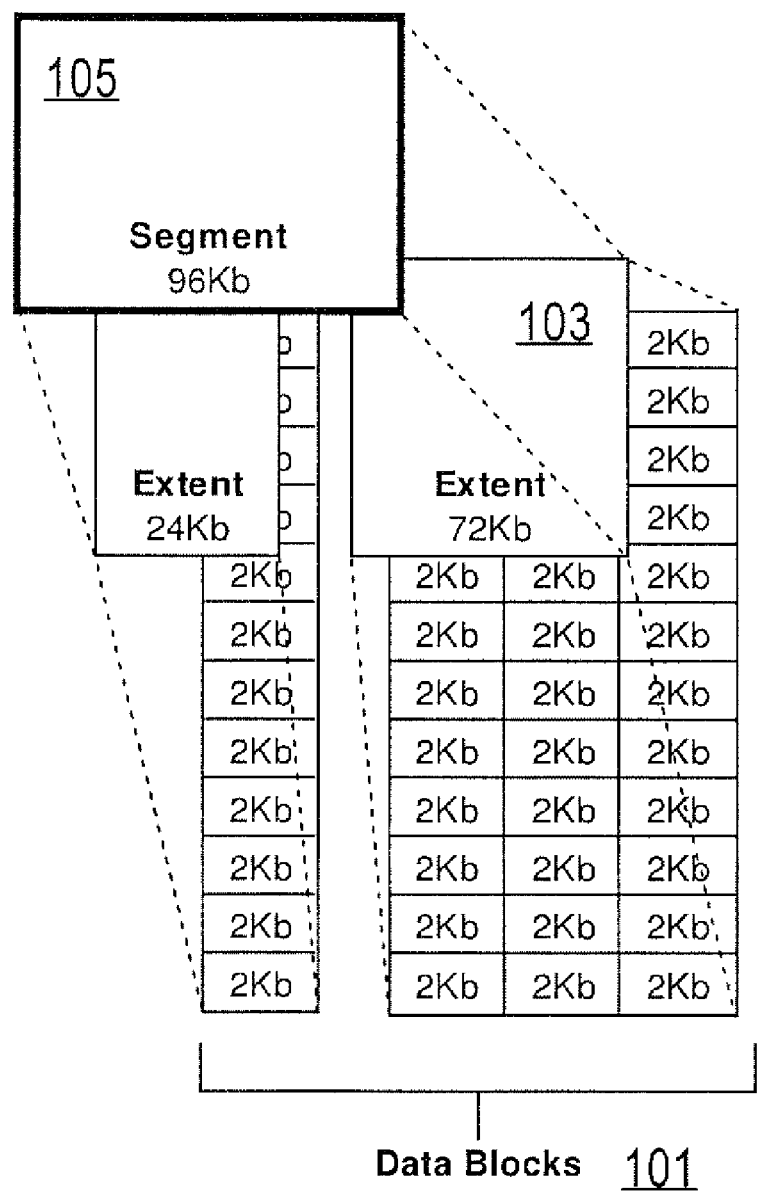
FIG. 1 is a block diagram that illustrates logical storage structures comprising a database on which an embodiment of the invention may be implemented.
Figure 2:
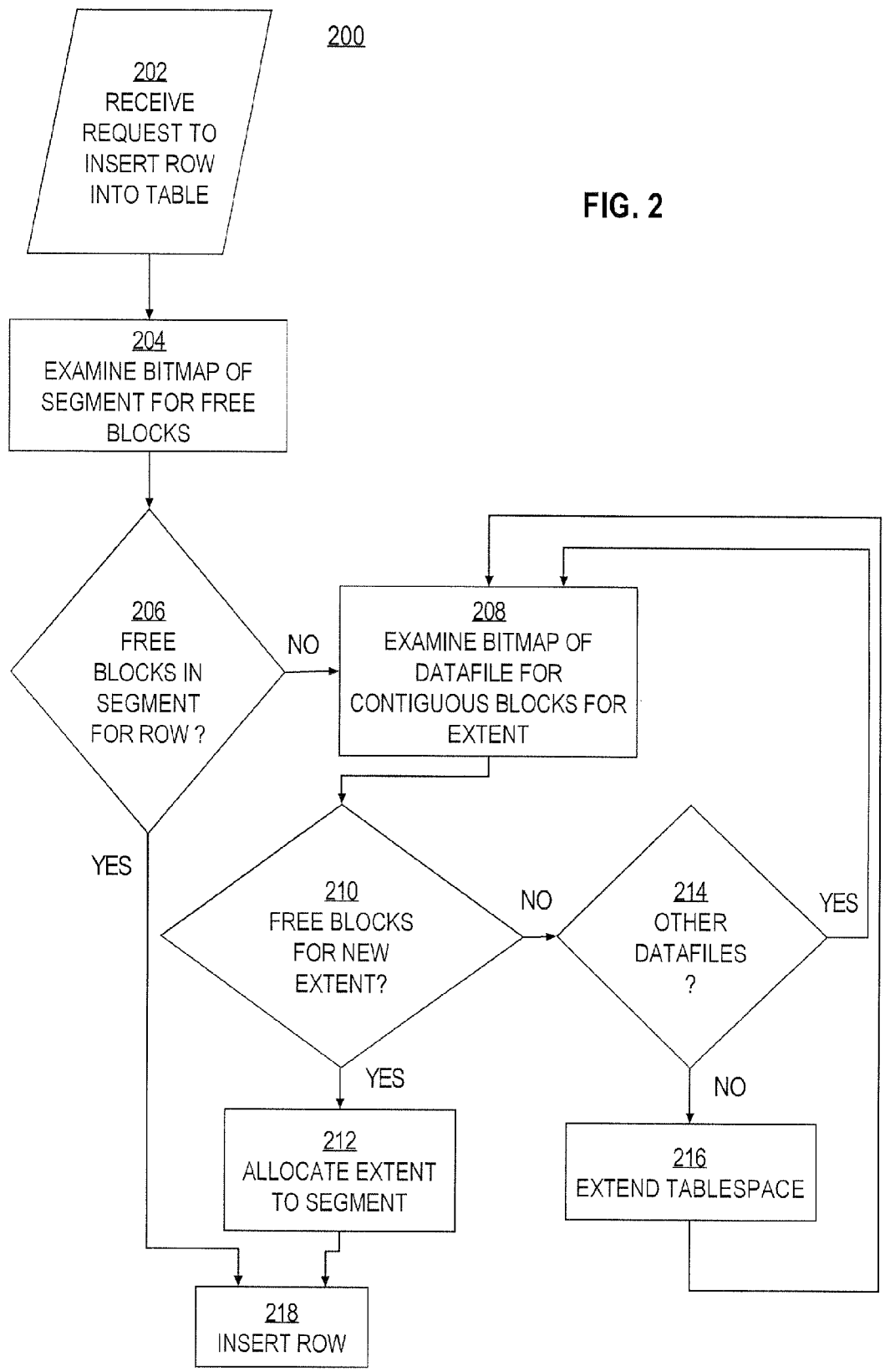
FIG. 2 is a flowchart illustrating the allocation of space to a logical structure as implemented in a prior approach.

Referring to FIG. 2, flowchart 200 illustrates a prior approach to allocating space to logical structures. While the flowchart shows a prior approach, wherein the allocating tasks are set into motion in response to a demand for space made by a user, certain of the steps are universal to all allocation. At step 202, a database server receives a request to insert a row into a table, which is stored in a particular segment or set of segments. At step 204, the server examines a data structure in the segment called a bitmap. At step 206, the server determines whether the segment has free space for the row. If the segment has reached full capacity, and then the database server grows the current segment by allocating additional extents to it, and control passes to step 208. If there is room in the segment, then the row is inserted at step 218. At step 208, the server examines a bitmap that is associated with the datafile for the segment, and determines which contiguous data blocks to allocate to the segment as an incremental extent. At step 210, the server determines if there are enough free data blocks to allocate an extent to the requesting segment. If there are enough free data blocks, then an extent is allocated to the segment at step 212, and control passes to step 218. If there are not enough free data blocks in the datafile, then it is determined at step 214 whether there are other datafiles that comprise the tablespace. If there are other files, then control passes to step 208 for the next datafile. If there are no other datafiles to examine, signifying that the tablespace is at full capacity, then the tablespace is extended at step 216. In another approach, an additional tablespace may be added to the database.

A database can be enlarged at step 216 by adding a datafile to a tablespace, by adding a new tablespace, or by extending the size of the datafile. When a datafile is created, the operating system running the database server is responsible for clearing old information and authorizations from a file before allocating it to the database. If the file is large, then the process can take a significant amount of time. Also, the extension of a tablespace must be done serially to protect private metadata.

Periodic Background Allocation

In one embodiment of the invention, the database server predicts when a logical layer will reach full capacity, and, based on this prediction, proactively pre-allocates space to a layer in a timely manner. Ideally, space will always be available when a user requests to insert new data into a database, and the operation will be returned nearly immediately.

Figure 3:
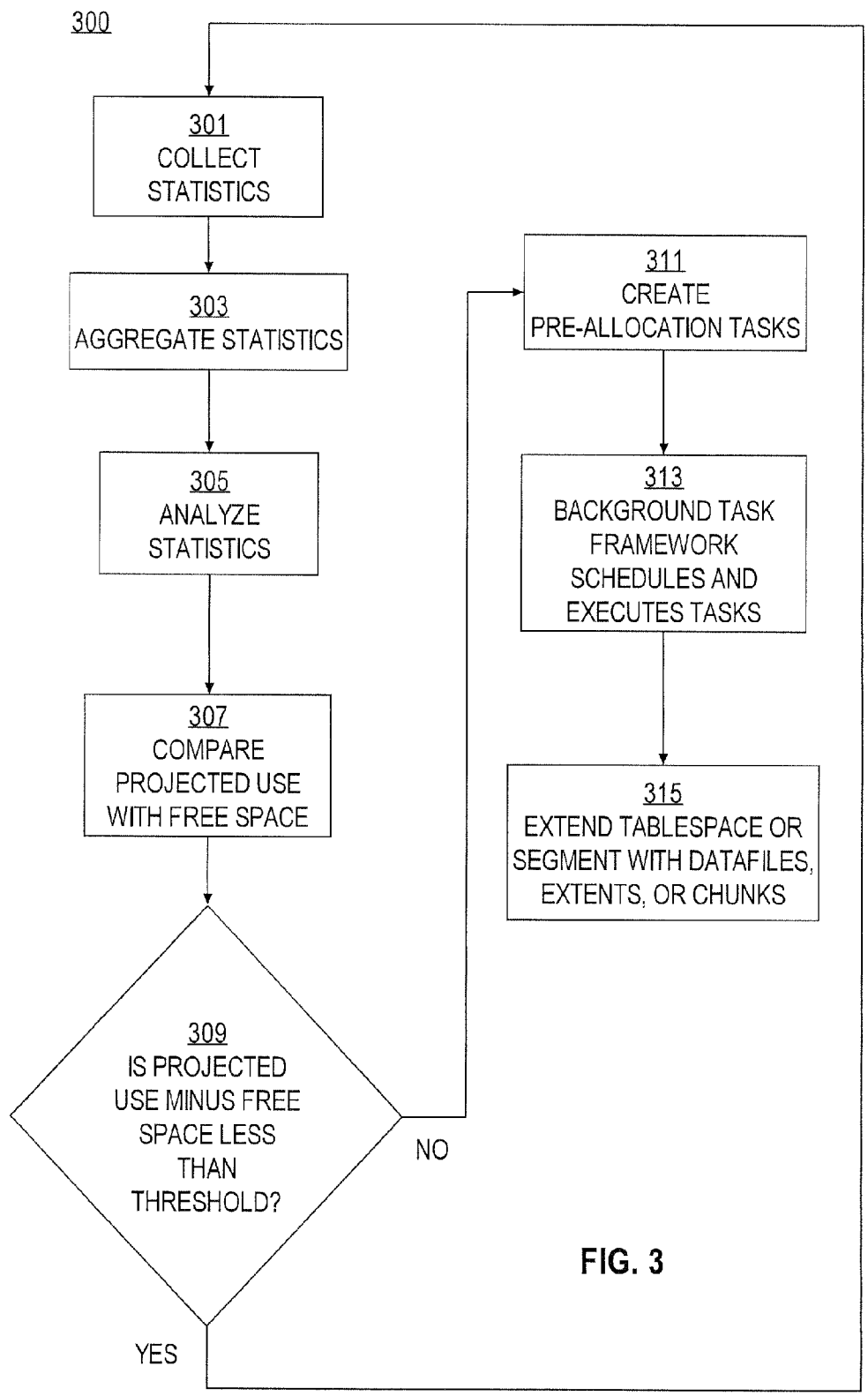
FIG. 3 is a flowchart illustrating the periodic process that occurs at a selected time interval for the pre-allocation of space by a background process, according to one embodiment of the invention.

Referring to FIG. 3, flowchart 300 shows the periodic process that occurs at a selected time interval for the pre-allocation of space by a background process in one embodiment of the invention. At step 301, statistics are collected from a particular instance of the database server regarding space usage for a particular level of logical structure during normal operations. At step 303, the statistics for each instance are aggregated. At step 305, the statistics are analyzed.

In one embodiment, the system analyzes the statistics, and forecasts space usage for the next hour. The input for the analysis for the tablespace layer is the tablespace space usage history, and the output is the projected space usage for each active tablespace of the database. The system conducts tablespace space usage history analysis every ten minutes. In one embodiment of the invention, the space usage history spans the preceding six hours of access and allocation activities. The statistics collected and analyzed include data regarding prior de-allocation of space as well as prior allocation.

In one embodiment, because there are large numbers of segments and tablespaces, prioritized candidates are chosen. In such an embodiment, only the statistics for the most active segments and tablespaces are collected and analyzed. Segments or tablespaces that have not been analyzed for an extended period are also candidates.

At step 307, in one embodiment, the projected space usage for the next hour is compared against the currently available space. A determination of the sufficiency of space is not limited to determining whether the projected space usage is greater than the currently available space. In one embodiment, at step 309, if the difference between the projected space usage and the currently available space is below a specified threshold, then no allocation tasks are created because the currently available space is deemed sufficient for the next hour. For example, if the value of the projected space usage minus the currently available space is less than 1 percent of the currently available space, then no allocation tasks are created. Otherwise, at step 311, space pre-allocation tasks are created based on the projected space usage, and control is passed to step 313. At step 313, the background task framework schedules and executes the pre-allocation tasks if necessary. The pre-allocation tasks executed by the background comprise some of the steps featured in FIG. 2. At step 315, allocation occurs in the background by extending a tablespace, extending a segment, or pre-allocating a large object (LOB) chunk.

Foreground-Triggered Proactive Space Allocation

The system maintains an average allocation rate for each tablespace or segment. However, during initial tablespace or segment growth, or during a growth spike, the demand for space may suddenly exceed the average allocation. Under such abnormal situations, the system issues either an out-of-space WARNING alert, or an out-of-space CRITICAL alert. In one embodiment, both alerts are based on a projected time when a particular tablespace or segment will reach full capacity. In one embodiment, the WARNING threshold is ten minutes, and the CRITICAL threshold is five minutes. Both alerts may also be based on the percentage of free space remaining in the tablespace or segment, or based on a particular quantity of free space remaining regardless of tablespace or segment size. In response to the WARNING alert, the foreground automatically will trigger the background to schedule and execute the pre-allocation tasks at the highest priority. In response to the CRITICAL alert, the foreground itself will execute the pre-allocation tasks.

Figure 4:
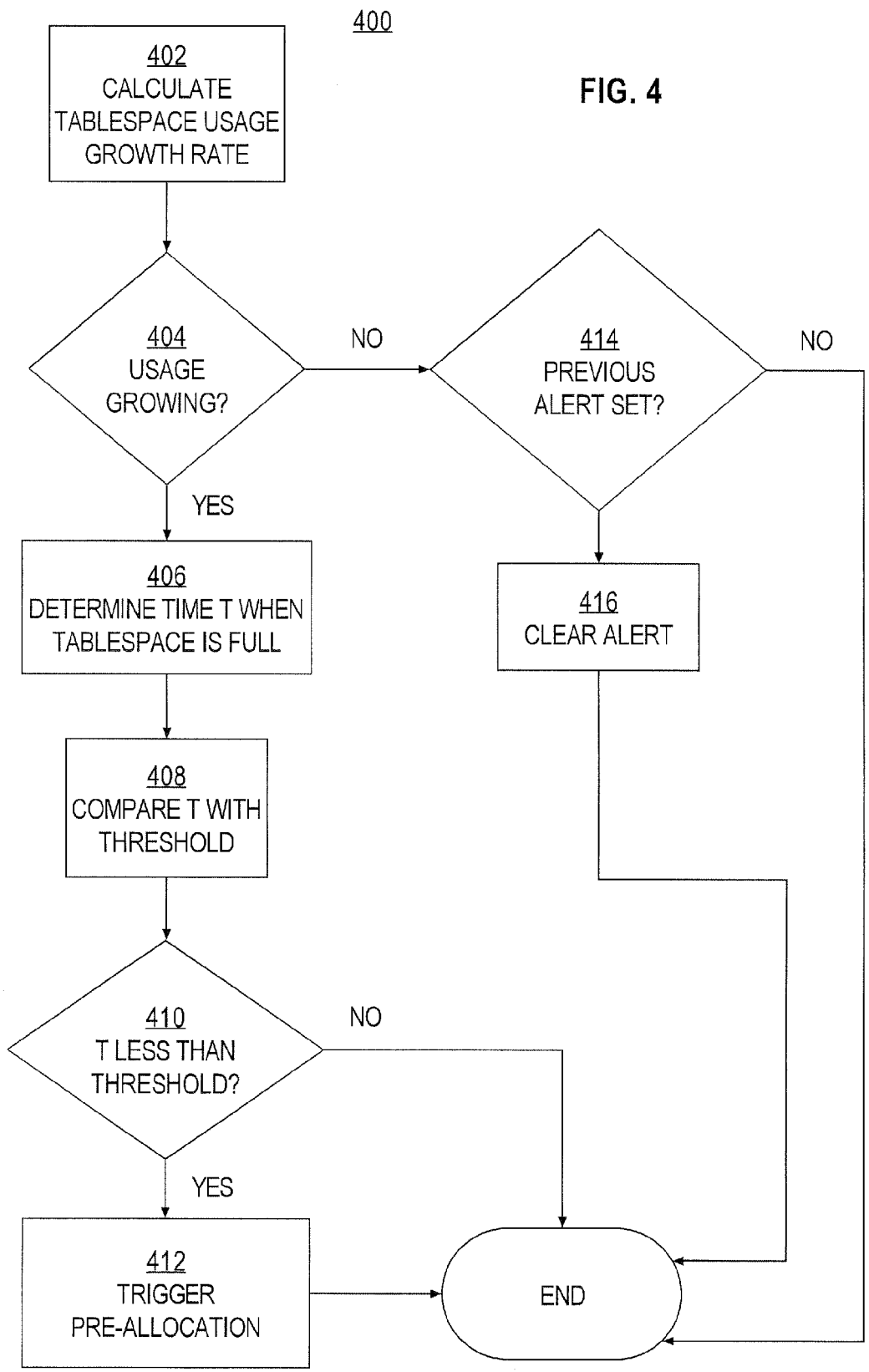
FIG. 4 is a flowchart illustrating the growth trend analysis leading to the generating of an out-of-space alert, according to one embodiment of the invention.

Referring to FIG. 4, flowchart 400 describes the growth trend analysis leading to the generating of an out-of-space alert, which triggers automatic pre-allocation. In one embodiment of the invention, the growth trend analysis is completed every ten minutes. While the example given is in relation to a tablespace, the analysis also applies to other logical layers and structures within a database. At step 402, the statistics that were collected and aggregated in steps 301 and 303 are used to calculate a tablespace usage growth rate. At step 404, it is determined if the space usage rate is growing. If space usage is growing, at step 406, a period within which the tablespace will reach full capacity is determined. Then, at step 408, the period is compared against the WARNING or CRITICAL thresholds. At step 410, if the period is less than the WARNING or CRITICAL thresholds, then a WARNING or CRITICAL alert is set, respectively. At step 412, either a foreground-triggered background pre-allocation or a foreground pre-allocation occurs. In one embodiment of the invention, a WARNING alert causes the foreground to trigger background pre-allocation, and a CRITICAL alert causes the foreground to directly pre-allocate to a layer. If the space usage rate is not growing, then at step 414, it is determined if a previous alert had been set. If an alert had been set, then the alert is cleared at step 416.

Hardware Overview

Figure 5:
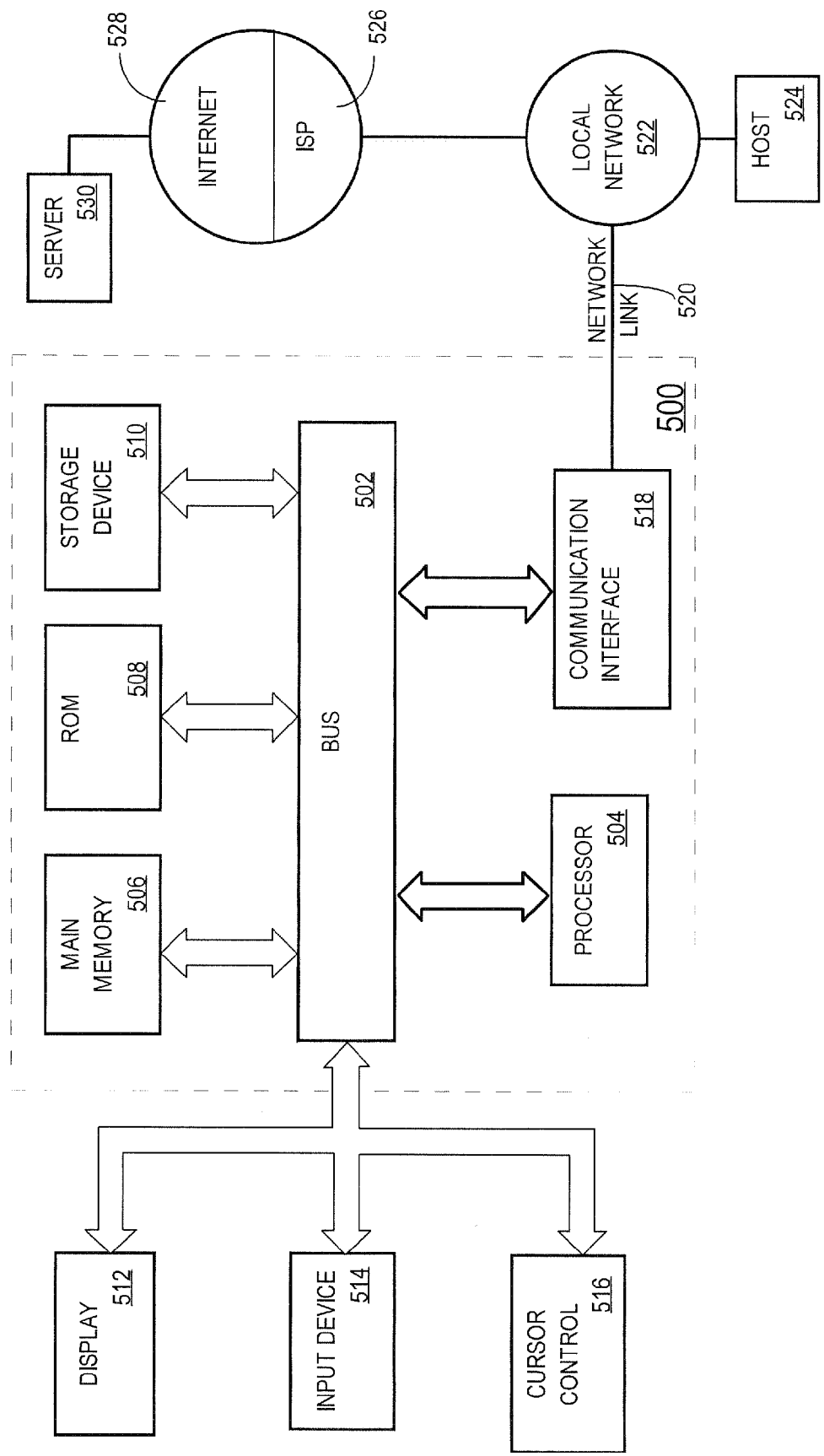
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising performing a machine-executed operation involving instructions, wherein said instructions are instructions that, when executed by one or more processors, cause the one or more processors to perform certain steps including:
   determining a first quantity of space within a unit of logical structure that will be used within a particular period;
   determining a second quantity of free space within the unit of logical structure;
   comparing the first quantity and the second quantity;
   based on the comparing, determining whether the second quantity is sufficient for the particular period;
   if the second quantity is sufficient for the particular period, then performing the certain steps at a subsequent time; and
   if the second quantity is not sufficient for the particular period, allocating space to the unit.

2. The method of claim 1, wherein the allocating further includes:
   generating space allocation tasks based on the comparing step; and
   executing the tasks.

3. The method of claim 1, wherein the determining a first quantity of space further includes:
   collecting statistics of a particular unit of logical structure; and
   analyzing the statistics.

4. The method of claim 1, wherein the steps are performed by a database server.

5. The method of claim 1, wherein the steps are performed by a file storage server.

6. The method of claim 1, wherein the unit of logical structure is a tablespace.

7. The method of claim 1, wherein the unit of logical structure is a segment.

8. The method of claim 1, wherein the space is a datafile.

9. The method of claim 1, wherein the space is an extent.

10. The method of claim 1, wherein the space is a LOB chunk.

11. A computer-readable storage medium carrying one or more sequences of instructions which, when executed by one or more processors, causes the one or more processors to perform the method recited in claim 1.

12. A computer-readable storage medium carrying one or more sequences of instructions which, when executed by one or more processors, causes the one or more processors to perform the method recited in claim 2.

13. A computer-readable storage medium carrying one or more sequences of instructions which, when executed by one or more processors, causes the one or more processors to perform the method recited in claim 3.

14. A computer-readable storage medium carrying one or more sequences of instructions which, when executed by one or more processors, causes the one or more processors to perform the method recited in claim 4.

15. A computer-readable storage medium carrying one or more sequences of instructions which, when executed by one or more processors, causes the one or more processors to perform the method recited in claim 5.

16. A computer-readable storage medium carrying one or more sequences of instructions which, when executed by one or more processors, causes the one or more processors to perform the method recited in claim 6.

17. A computer-readable storage medium carrying one or more sequences of instructions which, when executed by one or more processors, causes the one or more processors to perform the method recited in claim 7.

18. A computer-readable storage medium carrying one or more sequences of instructions which, when executed by one or more processors, causes the one or more processors to perform the method recited in claim 8.

19. A computer-readable storage medium carrying one or more sequences of instructions which, when executed by one or more processors, causes the one or more processors to perform the method recited in claim 9.

20. A computer-readable storage medium carrying one or more sequences of instructions which, when executed by one or more processors, causes the one or more processors to perform the method recited in claim 10.

* * * * *